United States Patent Office 3,138,578
Patented June 23, 1964

3,138,578
PROPYLENE POLYMERIZATION AND $Al_2F_6$ CATALYST THEREFOR
Donald F. Hoeg, Rockville, Md., assignor to W. R. Grace & Co., Clarksville, Md., a corporation of Connecticut
No Drawing. Filed May 18, 1960, Ser. No. 29,789
7 Claims. (Cl. 260—93.7)

This invention relates to the polymerization of olefins. More particularly, this invention is directed to a novel catalyst for polymerizing olefins.

It is known to polymerize propylene in the absence of a solvent at a temperature of from about 160° C. up to about 500° C. in the presence of a catalyst consisting essentially of $Al_2F_6$. See British 478,601. The product obtained is a liquid polymer of propylene having a low degree of polymerization. It is also known to subject propylene to the action of an aluminum tri(lower) alkyl. The product obtained is a dimer.

Surprisingly it has now been discovered that high molecular weight crystalline solid polypropylene is obtained by subjecting propylene in the presence of a solvent at a temperature ranging from room temperature up to 100° C. to the action of a catalyst consisting essentially of aluminum fluoride activated by heating at a temperature of at least 120° C. for at least 1 hour and preferably, in addition, also containing an aluminum tri(lower) alkyl.

The propylene polymer obtained by the instant invention is crystalline to X-rays (unannealed), has greater than 50% isotasticity, as characterized by X-ray scattering methods, and has a melting point in the range 165–176° C.

In order to obtain solid crystalline polypropylene by the instant invention, it is critical that the $Al_2F_6$ be activated prior to polymerization use. The activation is carried out by heating reagent grade $Al_2F_6$ a a temperature of at least 120° C. for at least 1 hour. The heating can be prolonged for periods of 5 days or more but such periods are unnecessary.

The $Al_2F_6$ activation step, if desired, can be performed in an inert atmosphere, e.g. nitrogen or the noble gases. However, such a precaution is unnecessary and the activation by heating can be performed in a vacuum or in air if the thus-activated $Al_2F_6$ is transferred to an inert atmosphere e.g. nitrogen while still at a temperature of at least 120° C. prior to cooling and storage.

The following examples will aid in describing the present invention but are not to be deemed as limiting its scope.

EXAMPLE 1.—$Al_2F_6$ ACTIVATION 30 g. of Baker and Adamson reagent grade $Al_2F_6$ were heated at a temperature of 120° C. in an oven in air for a period of 72 hours. The thus heated $Al_2F_6$ was transferred in a nitrogen atmosphere to a sealed dry flask and cooled therein under nitrogen to room temperature for future catalytic use.

EXAMPLE 2.—PROPYLENE POLYMERIZATION 0.772 g. of $Al_2F_6$ from Example 1 was charged under nitrogen to a 1-liter stainless-steel stirred polymerization reactor. 204 g. of cyclohexane was added to the reactor, stirring was commenced and heat applied to raise the reactor temperature to 90° C. Propylene was then added to the reactor until the pressure in the reactor was 400 p.s.i.g. The pressure was maintained in the range 400 to 420 p.s.i.g. by adding more propylene. After 4 hours the run was discontinued. Unreacted propylene was vented, the reactor was cooled and the solid polymer product was washed in an HCl isopropanol-acetyl acetonate solution to remove the catalyst. The washed polymer was further subjected to a $H_2O$ wash followed by a second HCl-isopropanol-acetyl acetonate solution wash prior to being dried in a vacuum oven overnight at 60° C. The dried solid polypropylene product weighed 1.2 g. and was crystalline to X-ray analysis.

EXAMPLE 3

0.75 g. of $Al_2F_6$ from Example 1 was charged under nitrogen to a 1-liter stainless steel stirred polymerization reactor. 300 g. of cyclohexane was added with agitation and the reactor heated to 90° C. 2.04 g. triethyl aluminum were then charged to the reactor followed by the addition of propylene until the pressure in the reactor was 400 p.s.i.g. Additional pressurizing with propylene was necessary during the run to maintain a pressure in the range 400 to 475 p.s.i.g. After 7½ hours the run was discontinued and the polymer product was washed and dried as in Example 2. The dried solid polypropylene product weighed 5.5 g. Characterization of the product by X-rays showed that it consisted of 60% isotactic helical segments and developed 58% crystallinity after a 1-hour anneal in argon at 130° C.

The necessity for activation of the $Al_2F_6$ to obtain a solid polymer of propylene is shown by the following example.

EXAMPLE 4

1.589 g. of Baker and Adamson reagent grade $Al_2F_6$ was charged to a 1-liter stainless steel stirred autoclave along with 204 ml. of cyclohexane. The autoclave was heated with agitation to 85° C. and 4.34 g. of triethyl aluminum were added thereto. The autoclave was pressurized to 400 p.s.i.g. with propylene and the run was continued under these conditions for 3 hours. No solid polymer product was obtained.

The following table shows various activation and polymerization conditions, which are operable in performing the instant invention.

Table 1

| Example No. | Run No. | $Al_2F_6$ Activation | | Catalyst moles ×10⁻² | | Polymerization Conditions | | | Solid Polypropylene Product (gms.) |
|---|---|---|---|---|---|---|---|---|---|
| | | Temp. (° C.) | Time (hrs.) | $Al_2F_6$ | $(CH_3CH_2)_3Al$ | Temp. (° C.) | Pressure (p.s.i.) | Time (hrs.) | |
| 5 | 272-37 | 120 | 72 | 1.24 | 2.48 | 80-82 | 160-175 | 1 | 3.0 |
| 6 | 324-9 | ᵃ 125 | 1 | 1.73 | 3.46 | 92-95 | 435-450 | 4 | 1.07 |
| 7 | 324-11 | ᵃ 125 | 40 | 1.17 | 2.34 | 85-90 | 370-465 | 4 | 1.24 |
| 8 | 324-12 | 250 | 24 | 1.03 | 2.06 | 85-91 | 375-430 | 4 | 1.17 |

ᵃ Heated in vaccum 50 mm. Hg.

Although the aluminum trialkyl used in the examples was aluminum triethyl, any of the aluminum tri(lower) alkyls can be substituted therefore and are equally operable. Such aluminum tri(lower) alkyls include tripropyl, triisopropyl, tributyl, triamyl, triisoamyl, trihexyl, triisohexyl, triheptyl, trimethyl and trioctyl aluminum.

The ratio of $Al_2F_6$ to aluminum tri(lower) alkyl is not critical. The use of relatively small amounts of aluminum trialkyl will cause some increase in catalytic activity of the activated $Al_2F_6$. Mole ratios of $Al_2F_6$:aluminum trialkyl of 1:0.1 to 10 are operable, preferably, 1:0.5 to 3 is employed.

The amount of catalyst that can be used to effect a polymerization can vary considerably. Relatively small amounts are operable to form relatively large amounts of polymer. In general, a suitable range is 0.001–10 g. catalyst per gram of propylene polymerized. Even larger amounts of catalyst are operable but occasionally present a purification problem.

In practising this invention it has been found that pressure ranging from atmospheric up to 1000 p.s.i. are desirable to cause the reaction to proceed. Preferably, however, a pressure of at least 300 p.s.i. or higher maintained. The reaction can also be performed at relatively high pressures e.g. 5000 p.s.i. and higher, however, the additional expense of equipment required to withstand such pressures in general outweighs the increased polymer yields and/or shorter reaction periods.

A reaction temperature in the range from room temperature up to 100° C. is operable. Preferably a reaction temperature in the range 70 to 100° C. is employed.

As a reaction menstruum, substantially any inert material can be used which is liquid under the conditions of temperature and pressure employed and which has a solvent action on propylene. These solvents are well known in the art. The inert liquid hydrocarbon solvents are preferred, and are preferably substantially free of materials that react with or deactivate the catalyst e.g. water, $O_2$, $CO_2$, acetylene, $NH_3$, and ethers, ketones and similarly reactive compounds. Suitable solvents include pentane, hexane, heptane, cyclohexane, octane, benzene, xylene, toluene, and the like.

Uses of the product of this invention are many and varied. The polypropylene produced by this invention has the same uses as that produced by the prior art including film, filament, and molded or extruded articles, e.g. tubes, bottles and containers. The product of the instant invention can also be used in paper coating by conventional techniques such as coating multi-wall bags where excellent water vapor and water and chemical resistance is required along with flexibility at low temperatures.

In addition, this invention is useful in the manufacture of propylene homopolymers and copolymers, and it is valuable also in forming polymers from other olefinic materials such as butadiene, ethylene, butene-1, styrene, etc.

I claim:
1. The process of polymerizing propylene to solid crystalline polypropylene that comprises subjecting propylene in a liquid hydrocarbon reaction medium to the action of a catalyst consisting essentially of $Al_2F_6$ which has been activated by heating at a temperature of at least 120° C. for at least 1 hour.

2. The process according to claim 1 wherein the polymerization is performed at a temperature ranging from room temperature up to 100° C.

3. The process of polymerizing propylene to solid crystalline polypropylene that comprises subjecting propylene at a reaction temperature in the range from room temperature up to 100° C. in a liquid hydrocarbon reaction medium to the action of a catalyst consisting essentially of $Al_2F_6$ which has been activated by heating at a temperature of at least 120° C. for at least 1 hour and an aluminum trialkyl wherein the alkyl groups contain 1 to 8 carbon atoms.

4. The process according to claim 3 in which the $Al_2F_6$:aluminum trialkyl mole ratio is 1:0.1 to 10.

5. The process of polymerizing propylene to solid crystalline polypropylene that comprises subjecting propylene in a cyclohexane solvent at a temperature of about 90° C. and a pressure in the range 400 to 425 p.s.i.g to the action of a catalyst consisting essentially of $Al_2F_6$ activated by heating at 120° C. for a period of 72 hours.

6. The process of polymerizing propylene to solid crystalline polypropylene which comprises subjecting propylene monomer in a cyclohexane solvent at a temperature of about 90° C. and a pressure in the range 400 to 475 p.s.i.g. to the action of a catalyst consisting essentially of $Al_2F_6$ activated by heating at 125 ° C. for a period of at least 1 hour and triethyl aluminum.

7. The process according to claim 6 in which the $Al_2F_6$:triethyl aluminum mole ratio is 1:2.

References Cited in the file of this patent

UNITED STATES PATENTS

| | | |
|---|---|---|
| 2,673,139 | Woolf et al. | Mar. 23, 1954 |
| 2,681,267 | Calfee | June 15, 1954 |
| 2,878,240 | Schmerling | Mar. 17, 1959 |
| 2,915,516 | Juveland et al. | Dec. 1, 1959 |
| 2,989,487 | Truett | June 20, 1961 |

FOREIGN PATENTS

| | | |
|---|---|---|
| 478,601 | Great Britain | Jan. 28, 1938 |